(12) United States Patent
Majewski et al.

(10) Patent No.: US 6,405,674 B1
(45) Date of Patent: Jun. 18, 2002

(54) CABINET FOR FEED PRODUCTS

(76) Inventors: Andrew M. Majewski, 31431 NE. 161 St., Duvall, WA (US) 98019; Kevin Nee, P.O. Box 323, Kent, WA (US) 98035

(*) Notice: Subject to any disclaimer, the term of this patent is extended or adjusted under 35 U.S.C. 154(b) by 75 days.

(21) Appl. No.: 09/690,445

(22) Filed: Oct. 18, 2000

(51) Int. Cl.$^7$ .............................. A01K 5/01; A01K 5/02; G07F 11/06
(52) U.S. Cl. .................. 119/52.1; 119/51.13; 119/56.1; 119/57.92; 221/90; 221/112; 221/114
(58) Field of Search .................. 119/52.1, 51.11, 119/51.12, 51.13, 56.1, 51.14, 51.04, 57.92; 221/90, 112, 114, 124

(56) References Cited

U.S. PATENT DOCUMENTS

| | | | |
|---|---|---|---|
| 317,708 A | | 5/1885 | Bissell |
| 493,219 A | | 3/1893 | McQueen |
| 998,423 A | | 7/1911 | Stephens |
| 1,442,382 A | * | 1/1923 | Bullock |
| 2,585,371 A | * | 2/1952 | Coffing |
| 3,683,859 A | | 8/1972 | Kirk |
| 3,685,689 A | * | 8/1972 | Borner et al. .................. 221/90 |
| 4,183,327 A | | 1/1980 | Olsen |
| 4,251,177 A | * | 2/1981 | Neuhaeusser et al. ...... 414/276 |
| 4,350,120 A | | 9/1982 | Bittle |
| 4,492,183 A | | 1/1985 | Chiotasso et al. |
| 4,656,969 A | | 4/1987 | Rapp et al. |
| 4,665,863 A | | 5/1987 | Toledo |
| 4,848,592 A | * | 7/1989 | Shemeta ..................... 221/211 |
| 4,949,674 A | | 8/1990 | Young |
| 5,109,799 A | * | 5/1992 | Lader ....................... 119/51.13 |
| 5,230,300 A | | 7/1993 | Mezhinsky |
| 5,345,893 A | * | 9/1994 | Morris .................... 119/51.11 |
| 5,433,171 A | | 7/1995 | Ewell |
| 5,520,143 A | | 5/1996 | Duin |

FOREIGN PATENT DOCUMENTS

| | | |
|---|---|---|
| GB | 1 296 671 | 11/1972 |
| GB | 1 444 581 | 8/1976 |
| GB | 2 015 860 A | 9/1979 |

* cited by examiner

Primary Examiner—Yvonne R. Abbott
(74) Attorney, Agent, or Firm—Richard C. Litman

(57) ABSTRACT

An automated cabinet for feed products comprises a closable cabinet having two compartments, wherein one expansive compartment contains a plurality of animal feed supporting shelves which pivot downward sequentially from one hinged end at timed intervals by retraction of a lever system activated by an upwardly rotating trip mechanism (in another compartment) on a vertical jackscrew rotated by an electric motor operated by a programmed timer. A partition separates the compartments, and supports the lever system for every shelf, and a cutoff switch system for the uppermost shelf.

10 Claims, 6 Drawing Sheets

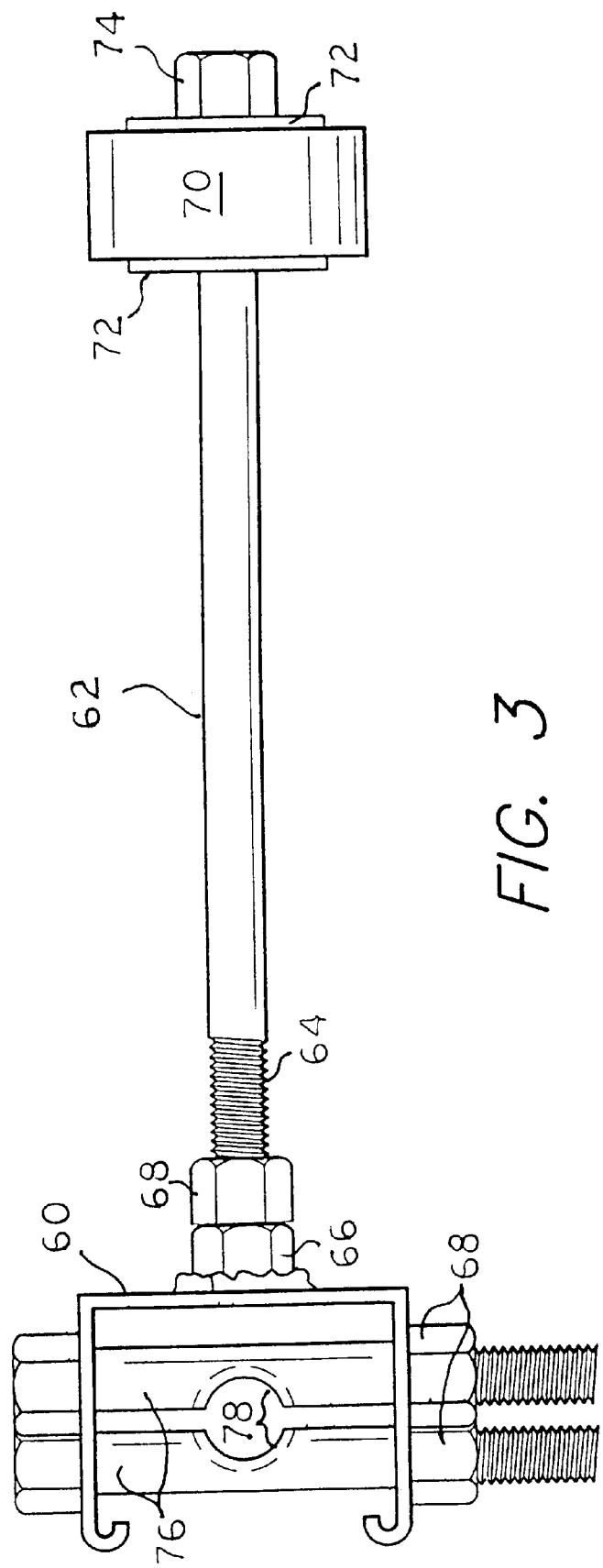

CABINET FOR FEED PRODUCTS

BACKGROUND OF THE INVENTION

1. Field of the Invention

The present invention relates to an automated animal feeding cabinet apparatus having downwardly rotating food containing shelves which pivot down from one side.

2. Description of the Related Art

The relevant art of interest describes various feeding apparatus, but none discloses the present invention. There is a need for an economical automated cabinet for scheduling the feeding of domestic or wild animals with food from ascending shelves at regular intervals without the requirement for hoppers.

The relevant art will be discussed in the order of perceived relevance to the present invention.

U.K. Patent Application No. 1 444 581 published on Aug. 4, 1976, for Peter Kenyon describes a closed animal food dispenser and open bottom trough feeder having a number of internal vertically spaced and trough shaped food containers for dispensing food bran in water from separate compartments, which troughs are pivotally mounted between a retaining position and a dispensing position. The food containers have releasable catches which are released to allow the containers to drop the food down into an integrated collecting trough. The release mechanisms comprise a vertical rod having release pins rotated at 15° intervals by a 24-hour high torque clock motor. The release pins release a spindle at each trough location by its arm and a catch member extending out to engage an upper end of the feeding trough. When tripped, the trough rotates downward from its bottom pin at its end on a hook support and empties its load of water and food. The food dispenser apparatus is distinguishable for its rotating arm with pins for engagement with pins on each releasable trough which are hinged to the rear panel of the cabinet.

U.S. Pat. No. 3,683,859 issued on Aug. 15, 1972, to Lloyd L. Kirk describes an automatic tripping device for releasing supporting floor members of six or seven cabinet compartments in one or two rows holding hay bales to discharge the hay in a timed sequence. A tripping cord passes through each tripping mechanism of each compartment from a cutoff switch to an electrical actuating device and a weight mounted on an external wall. A solenoid exerts the pulling force for tripping and taking up the cord slack. A floor member is released by a hinged supporting rod at one end and attached by a pivot pin to an arm holding the cord under the spring tension of a clasping member. The automatic tripping device is distinguishable for being based on a solenoid and weighted release cord system.

U.S. Pat. No. 4,350,120 issued on Sep. 21, 1982, to L. Gordon Bittle describes an elongated vertical feeder apparatus having a plurality of storage bins in a vertical stack defined by a movable shelf or open ended boxes for each bin selectively operated to drop stored food packages from the top portion of the feeder by means of a solenoid-operated ejector carriage moving downward. The ejector carriage comprises a horizontal platform supported by two side bare having two wheels each which engage two vertical rails. Two more spring-loaded wheels on the platform contact the vertical rails. The platform supports a solenoid which when actuated pushes out a movable slide on a spring to push out a movable shelf and at the same time release the hold on a retainer tongue on the rear wall. The platform then moves down to the next retainer tongue. The dropped food package enters a chute which has cutting blades to open up the package. The apparatus is distinguishable for the required dropping of food packages from the top portion, cutting the bags open, and its carriage requiring numerous guide wheels and a pair of rails.

U.S. Pat. No. 5,520,143 issued on May 28, 1996, to Robert R. Duin describes an apparatus for automatically dispensing measured amounts of hay flakes, grain, coarse granules, cubes or pellets to livestock on a pre-selected schedule. The apparatus has a rectangular frame with a loading portal on one side and dispensing doors on the opposite side. The row of cells can be arranged horizontally at an inclined angle with doors opening sequentially at the bottom of the cells or vertically with either top or rear-loading configurations. A horizontal linear sequencing bar having spaced slots permit the opening of a cell door when an extending door rod falls into the slot to open the door. A drive motor actuated by a timer control panel drives a pinion which advances a rack portion of the sequencing bar to open each door sequentially. The feeding apparatus is distinguishable for its horizontal opening of bin doors.

U.S. Pat. No. 4,665,863 issued on May 19, 1987, to George F. Toledo describes an animal feeding apparatus comprising a box housing with a plurality of chambers having inclined bottom walls and individual door panels opening downward when released by a rotating beaded chain having one large bead to trip the latches in sequence. A sprocket is driven by a geared down motor to open the feeding doors over a 24 hour or 48 hour duration. The apparatus is distinguishable for its required beaded drive chain and yoked latches.

U.S. Pat. No. 998,423 issued on Jul. 18, 1911, to Franklin M. Stephens describes an automatic stock-feeder apparatus comprising one or a plurality of feed hoppers suspended by swinging trip levers on a cable tensioned by a retractile spring to be unwound from an alarm clock's alarm arbor. The retractile spring can be replaced with a weight on a pulley. The hoppers are attached to a wall above a feed trough and the trip levers unlatch the trap door holding the feed. The apparatus is distinguishable for its requirement for individual feed hoppers and trap door being opened by an alarm clock mechanism.

U.S. Pat. No. 493,219 issued on Mar. 7, 1893, to Daniel McQueen describes a time stock feeder apparatus comprising a plurality of feeding hoppers attached to a rope and trigger on an alarm winding key of an alarm clock. The hoppers have a hinged valve attached by a vertical link to a bell crank which is pivotally secured and attached to the horizontal rope. The apparatus is distinguishable for its alarm clock and rope mechanism.

U.S. Pat. No. 317,708 issued on May 12, 1885, to Titus L. Bissell describes an automatic time stock feeder apparatus comprising a hopper having a trap-door opened by a trigger mechanism with forked arms by an eccentric on a rotating winding arbor of an alarm clock housed in a case positioned on the outside. The apparatus is distinguishable for its hopper structure and clock actuation.

U.S. Pat. No. 4,183,327 issued on Jan. 15, 1980, to Edward C. Olsen describes an automatic horse-feeding apparatus comprising a central hopper having a motor-driven shaft which agitates the feed while driving an impeller distribution assembly which apportions the feed into one or more chutes. A manually controlled damper assembly allows for simultaneously feeding a plurality of horses at different rates from the same feed hopper. An adjustable-control circuit provides for presetting the interval between feedings and the amount of each feeding. The apparatus is distinguishable for its individualized feeding of a plurality of horses from one feeder apparatus.

U.S. Pat. No. 4,492,183 issued on Jan. 8, 1985, to Pierre Chiotasso et al. describes an automatic distributor-feeder with plural compartments arranged in a carousel structure for feeding granular food down the hopper for domestic animals. The apparatus is distinguishable for its carousel structure.

U.S. Pat. No. 5,433,171 issued on Jul. 18, 1995, to Anthony S. Ewell describes an automatic pet food dispenser comprising separate compartments and collection bowls for feeding food from a hopper and water from a tank. Separate pressure sensing mechanisms measure the weight of each bowl for control of the feeding volumes. The apparatus is distinguishable for its computerized feeding mechanism of separated foods.

U.S. Pat. No. 5,230,300 issued on Jul. 27, 1993, to Victor Mezhinsky describes an automatic dry food feeder for animals comprising a box housing including inside a hopper feeding food by an electric motor and gearbox with flexible distribution vanes controlled by an externally mounted programmable controller and timer. The apparatus is distinguishable for its hopper structure and computer programmed controls.

U.S. Pat. No. 4,949,674 issued on Aug. 21, 1990, to Richard Young describes an automatic fishfood dispenser apparatus comprising two adjacent chambers hung on the inside of a fish tank and operated by batteries in a rear chamber. The front chamber holds the fishfood which is dispensed by a timer controlled grooved spindle on a motor. The apparatus is distinguishable for its dispensing hopper structure.

U.S. Pat. No. 4,656,969 issued on Apr. 14, 1987, to Benjamin F. Rapp et al. describes an automatic livestock feeder apparatus comprising a rectangular frame housing including an upper hopper and trough for handling dry or liquid feed. A feed level sensing device, a vibration means with a chain drive, a distributor control device, and a counter display are incorporated. The apparatus is distinguishable for its manifold control means for distributing feed from a vibrating hopper.

U.K. Patent Application No. 1 296 671 published on Nov. 15, 1972, for Anthony M. Hardy describes an animal feeding apparatus comprising a wall mounted hopper with four compartments having individual latched trap doors. An electric clock inside the housing drives a vertical shaft rotating a driving disc with a projection at the level of the trap doors to push back rods in sequence from their catches to open the trap doors. The apparatus is distinguishable for its multiple hopper feeding structure.

U.K. Patent Application No. 2 015 860 A published on Sep. 19, 1979, for Kjell V. U. Larson et al. describes an animal feeder apparatus comprising a vertical storage hopper containing paper bagged feed packages which are pushed by a motor driving an ejector rod into a vertical chute containing an optional metal wire or knife-blade cutter, and the feed landing on a feeding table. The apparatus is distinguishable for its required ejector mechanism and lack of shelves.

None of the above inventions and patents, taken either singularly or in combination, is seen to describe the instant invention as claimed. Thus, a cabinet for feed products solving the aforementioned problems is desired.

SUMMARY OF THE INVENTION

The invention is an animal feeding cabinet containing downwardly rotating shelves that hold food dropped into a feeding area at specified time intervals. The cabinet has six shelves for storing the food. A quantity of the food is to be dropped every four hours. Each shelf is supported by a pin which is moved by a lever and a trip mechanism. A motor with gear reduction turns a vertically oriented jack screw which trips the lever of each shelf sequentially. A safety switch is tripped by the uppermost shelf to turn off the motor. The gearing can be altered to vary the feeding intervals. A feeding timer can optionally be incorporated in the feeding system. The feeding cabinet can be mounted on a wall or be free standing.

Accordingly, it is a principal object of the invention to provide an automated animal feeding apparatus and system.

It is another object of the invention to provide an automated animal feeding apparatus and system having downwardly rotating shelves that hold food dropped into a feeding area at specified time intervals.

It is a further object of the invention to provide an automated animal feeding apparatus and system, wherein each shelf is supported by a pin which is moved by a lever and a trip mechanism.

Still another object of the invention is to an automated animal feeding apparatus and system, wherein a motor with gear reduction turns a vertically oriented jack screw which trips the lever of each shelf sequentially.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 3 is an enlarged top plan view of the tripping mechanism showing the matching grooved and threaded portions of the pair of bolts for ascending the jackscrew.

Similar reference characters denote corresponding features consistently throughout the attached drawings.

DETAILED DESCRIPTION OF THE PREFERRED EMBODIMENT

Figure 1:
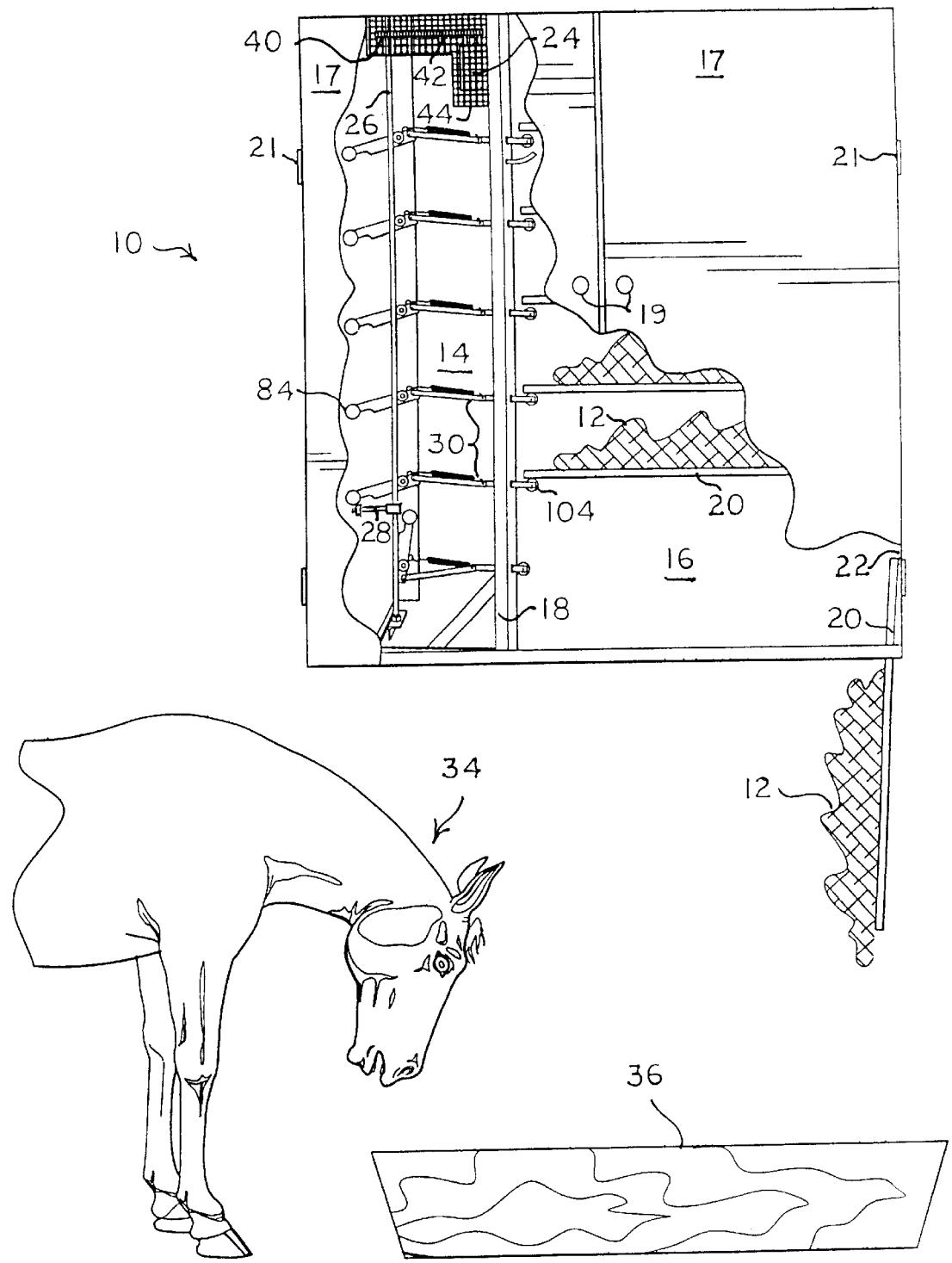
FIG. 1 is an environmental, perspective view of an automatic animal feeding cabinet with the closed doors partially broken away to show some feeding shelves supplying a feeding trough according to the present invention.

The present invention is directed in FIG. 1 to an automated animal feeding cabinet 10 for sequentially releasing feed products 12 comprising a rectangular closed box cabinet having a limited left side vertical space portion 14 and an expansive right side vertical space portion 16 separated by a vertical inside wall 18. The right side portion 16 contains a plurality of horizontally positioned shelves 20 equally spaced vertically and hinged to the right sidewall 22. The left side portion 14 contains a motor 24 adapted to rotate a vertical jackscrew 26. The two doors 17 are of equal size and open with door knobs 19 and hinges 21 on the outside edges. The cabinet 10 can be mounted either suspended from a ceiling, on a wall or on posts above a feeding trough 36.

A portion of a trip mechanism 28 is adapted to ascend the rotating jackscrew 26. A plurality of lever and pin assemblies 30 commensurate in number to the number of the shelves 20 support each shelf from below and extend through the separating vertical wall 18, whereby the motor 24 and jackscrew 26 operate to release each shelf 20 containing food 12 at predetermined intervals to feed animal(s) 34 at scheduled times at the feeding trough 36. In this illustration, a horse 34 is shown feeding on 3–4 in. thick hay flakes.

A geared down electric motor 24 drives a sprocket wheel 40 positioned on the top end of the jackscrew 26 via an endless chain 42. For the protection of users from accidental injury caused by the moving parts, a protective gridded cage 44 houses the motor 24, sprocket wheel 40 and chain 42.

Figure 4A:
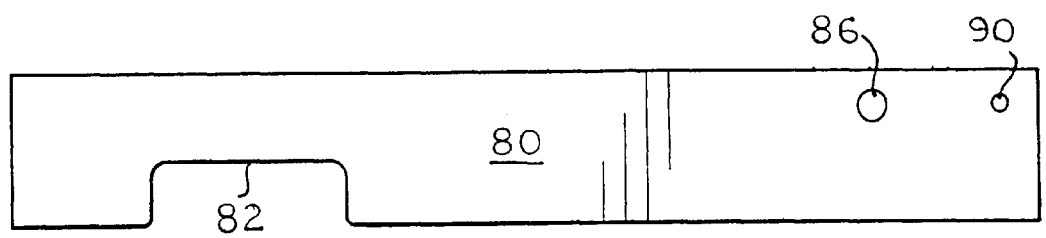
FIGS. 4A, 4B and 4C are detail views of the legs of the trip mechanism.
Figure 4B:
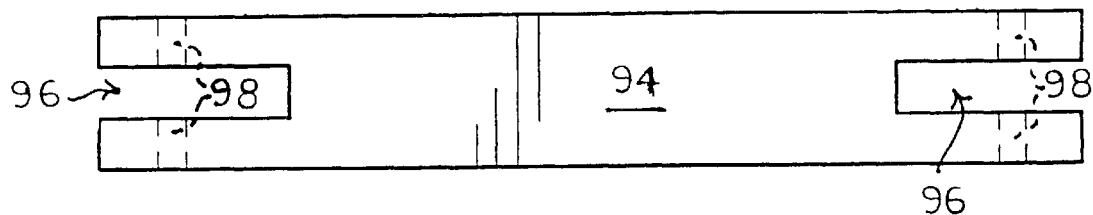
Figure 4C:
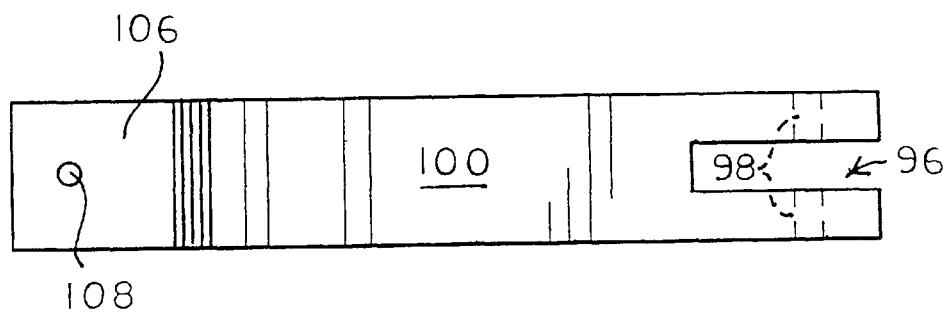
Figure 5:
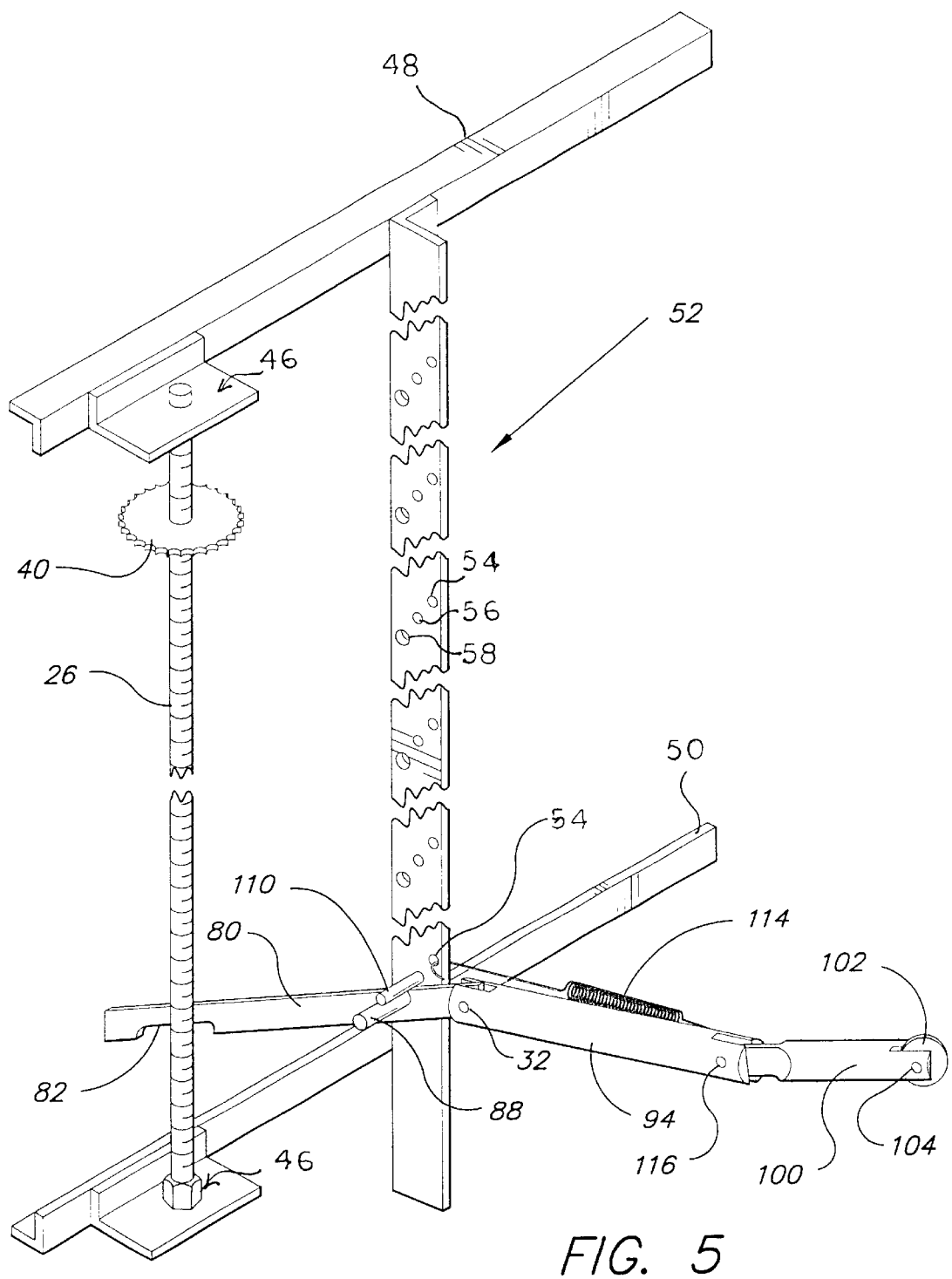
FIG. 5 is an exploded perspective view of the crossbars supporting the jackscrew with sprocket and the apertured standard with the trip mechanism.

Turning to FIGS. 2, 3, 4A to 4C, and 5 in particular, the trip mechanism 28 will be described in detail. FIG. 5 shows the jackscrew 26 with its sprocket wheel 40 supported by an apertured flange and bearing 46 on an upper crossbar 48 on top and another flange and bearing 46 on a lower crossbar 50. A vertical L-shaped (in cross-section) channel bar or standard 52 having a series of three apertures 54, 56 and 58 are arranged on the standard 52 for positioning the trip mechanism 28 for each shelf 20.

Figure 2:
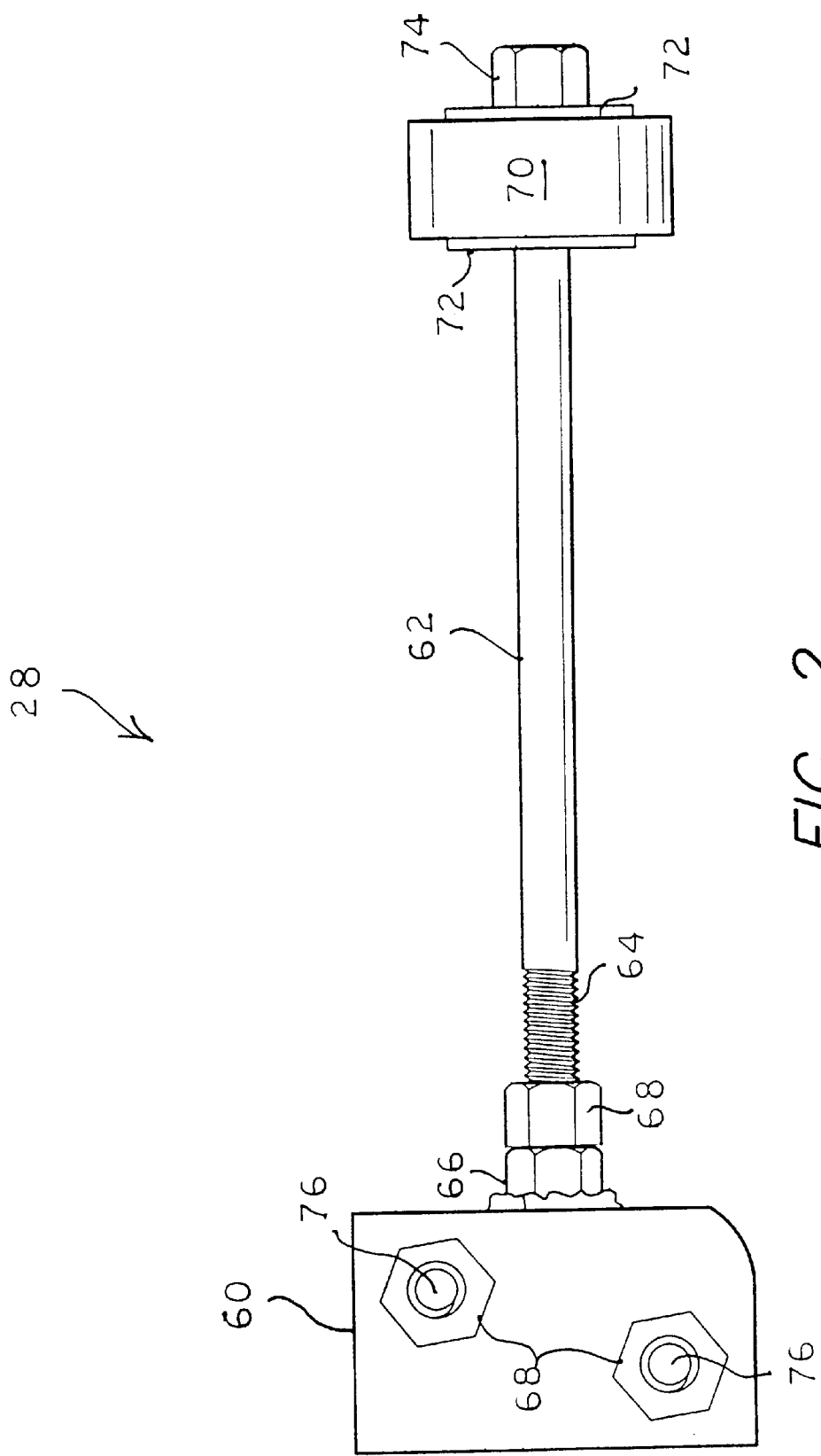
FIG. 2 is an enlarged side elvational view of the tripping mechanism.

In FIGS. 2 and 3, the critical portion of the trip mechanism 28 for ascending the rotating jackscrew 26 is depicted in two orthogonal views. A U-shaped bracket 60 is attached to a long bolt 62 having a threaded end 64 positioned in a fixed nut 66 and anchored with a locking nut 68. The opposite end of the rod 62 has a disk 70 fixed between two washers 72 and the head 74 of the bolt 62. The bracket 60 contains two aligned pins 76 fastened securely by locking nuts 68, wherein each pin 76 has a matching semicircular and internally threaded notch 78 which frictionally matches the threading of the jackscrew 26.

As seen in FIGS. 4A to 4C, an extended remaining portion of the trip mechanism 28 is made of three parts or legs. The proximate leg or lever 80 is a flat rod with an optional notch 82 for loosely engaging the jackscrew 26 as depicted in FIG. 5. It has been found that the trip mechanism when ascending the rotating jack screw 26 and engaging lever 80 would rotate counter-clockwise and travel the length of the lever 80 to retract pin 104 and allow a shelf 20 to drop. The notch 82 was formed to capture the long bolt 62 and prevent it from traveling off the end of lever 80. It is contemplated that as the mechanisms wear with age, the notch 82 would prevent the trip mechanism 28 from rotating to the point where the long bolt 62 might travel off the end of the lever 80 without the notch 82.

Figure 6:
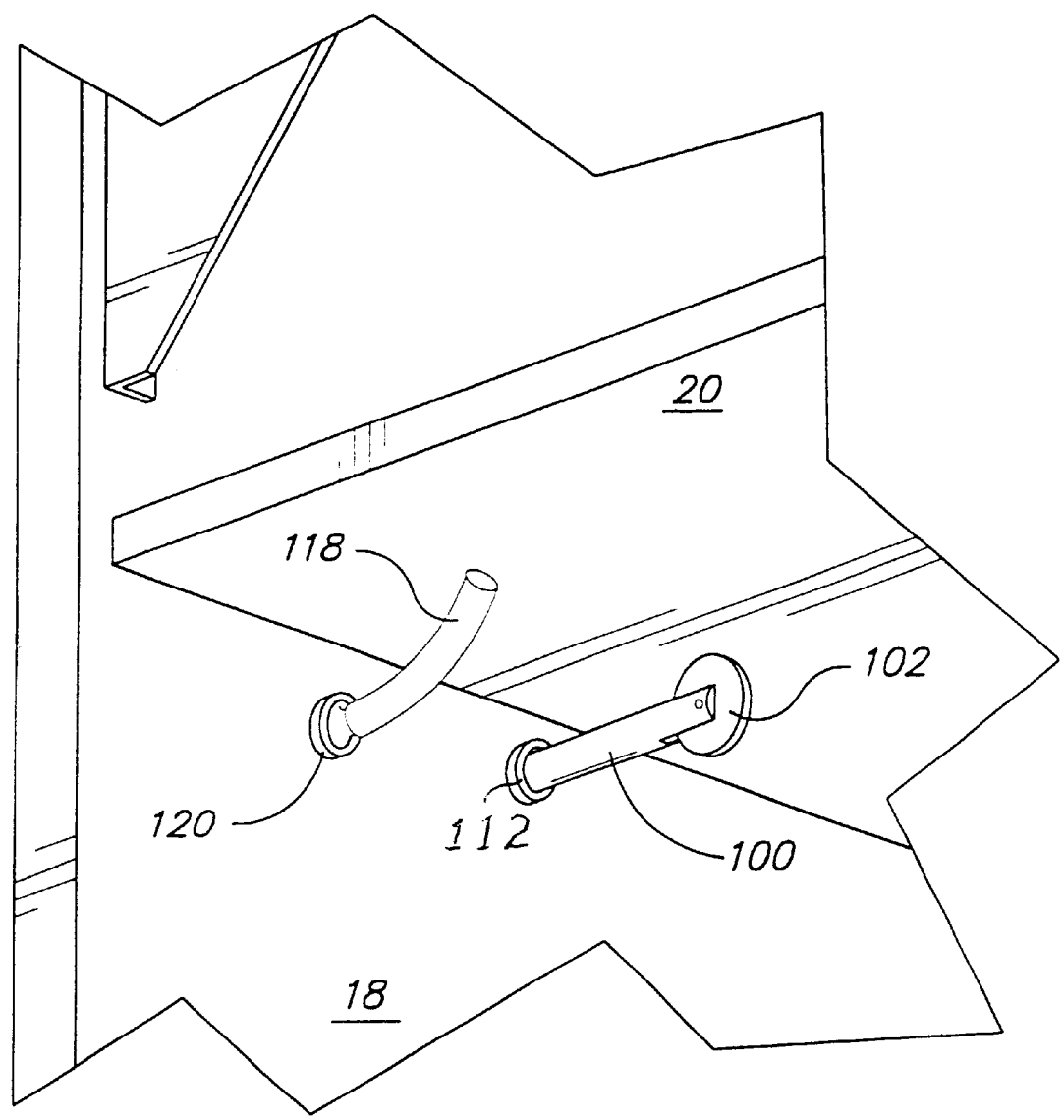
FIG. 6 is a detail view of the underside of the uppermost shelf showing the distal leg and wheel of the trip mechanism, and the timer-trip switch and extension hose extending from the wall.

A knob 84 is shown in FIG. 1 but dispensed with in FIGS. 4A and 5 as an alternative. A larger aperture 86 is for positioning the pivot pin 88 on the standard 52. The smaller aperture 90 is for connection with the middle leg 94 by a pop rivet 32 (FIG. 5). The middle leg 94 depicted in FIG. 4B has slots 96 having aligned throughbores 98 at both ends of a cylindrical bar for connecting cotter pins (not shown). The cylindrical distal leg 100 shown in FIG. 4C has a slot 96 and aligned throughbores 98 for mounting of a nylon wheel 102 on a pin 104 (FIGS. 1, 5 and 6). The opposite end has a flattened tab 106 having a throughbore 108 for connection with the middle leg 94 with a cotter pin. It should be noted that the middle leg 94 and the distal leg 100 function to bend when retracting.

The standard 52 has a stop pin 110 for limiting the upward and counter-clockwise rotation of the lever 80. The topmost aperture 54 of a trio of apertures on the standard 52 is for attachment of one end of a spring 114. The opposite end of spring 114 is attached to the eye of the cotter pin 116 joining the middle leg 94 to the distal leg 100 (FIGS. 1 and 5). The spring 114 maintains the tension as the distal leg 100 is withdrawn partially through the aperture 112 in the inside wall 18 (FIG. 6). It is noted that the shelf 20 is separated by a space from the wall 18 commensurate to enable the shelf 20 to fall down. A flexible hose 118 extending from a trip switch 120 shuts off the motor 24 after uppermost shelf descends and trips the switch 120. A programmable timer can be programmed to increase the feeding cycle as determined by the user.

Exemplary dimensions of the cabinet 10 and its parts:

Cabinet 10: Galvanized iron sheeting, 20 gauge; 46 in. tall, 40 in. wide and 28 in. deep; doors 17, 46 in. tall, 20 in. wide.

Shelves 20: Six shelves, 23.5 in. long, 22 in. deep; front hem 1 in. high.

Right side portion 16: 25 in. wide.

Left side portion 14: 15 in. wide.

Trip mechanism 28: U-shaped bracket 60, 2 in. square sides; 2 pins 76, 0.5 in. diameter, 0.5 in. apart, and notches 78 with 13 threads/in.; bolt 62, 0.5 in. diameter, 7 in. Lion; and disk 70, nylon, 1 in. diameter.

Lever (three parts) portion of the trip mechanism: Lever 80, 6 in. long, 1 in. wide, 0.125 in. thick flat steel; notch 82, 1 in. long and 1 in. from the free end; middle leg 94, 6.25 in. long, 0.5 in. diameter steel with slots 96 1 in. deep and 0.19 in. wide; and throughbores 98, 0.19 in. diameter; and distal leg 100, 4.5 in. length, 0.5 in. diameter, tab 106 with 0.125 in. diameter throughbore 108 and slotted end 96 1 in. deep and 0.19 in. wide to support a 1.0 in. diameter nylon wheel.

Motor 24: 1/50 or fractional hp., 1 revolution per minute, gear reduction 3 to 1 and preferred 15 to 1 for increased leverage.

Sprocket wheel 40: 9–27 teeth revolving once in 3 minutes.

Jackscrew 26: 45 in. long, 0.5 in. diameter, 13 threads/in.

It should be noted that the size of the cabinet and the number of shelves required is exemplary to suit the needs of the user and the animals being fed. The gearing can be varied to increase or decrease the feeding interval and even feed for several days without restocking the shelves.

It is to be understood that the present invention is not limited to the embodiment described above, but encompasses any and all embodiments within the scope of the following claims.

We claim:

1. An automated cabinet for sequentially releasing feed products comprising:

a rectangular closed box cabinet having a limited left side vertical space portion, an expansive right side vertical space portion, and a vertical internal wall separating the left side and right side space portion;

said right side portion containing a plurality of horizontally positioned shelves equally spaced vertically and hinged to the right sidewall;

said left side portion containing a motor adapted to rotate a vertical jackscrew; and a trip mechanism adapted to ascend said rotating jackscrew;

a plurality of lever and pin assemblies commensurate in number to the number of the shelves and supporting each shelf from below and extending through the separating vertical wall;

whereby the motor and jackscrew operate to release each shelf containing food at predetermined intervals to feed animals at scheduled times.

2. The automated feeding cabinet according to claim, 1 wherein the trip assembly comprises a U-shaped bracket having two aligned pins with semicircular and threaded notches for ascending the jackscrew.

3. The automated feeding cabinet according to claim 2, wherein the U-shaped bracket is attached to a bolt having a fixed disk.

4. The automated feeding cabinet according to claim 1, wherein each of the plurality of lever and pin assemblies comprises three contiguous and pivotable leg portions made up of a lever portion, a middle leg, and a distal leg having a wheel which supports a shelf.

5. The automated feeding cabinet according to claim 4, wherein only the distal leg and wheel extend into the right side portion of the cabinet through the vertical internal wall.

6. The automated feeding cabinet according to claim 4, including a retractile spring connected to the middle leg operates to contract the lever and pin assembly of each shelf.

7. The automated feeding cabinet according to claim 1, including an upright standard which pivotally supports each lever and pin assembly on a pivot pin.

8. The automated feeding cabinet according to claim 7, including a stop pin positioned above each pivot pin.

9. The automated feeding cabinet according to claim 1, including a motor cutoff switch positioned below an uppermost shelf which stops the rotation of the jackscrew when the uppermost shelf is released to rotate down.

10. The automated feeding cabinet according to claim 9, including a flexible extension of the motor cutoff switch which permits the downward rotation of the uppermost shelf when released.

* * * * *